United States Patent [19]

Wanner

[11] Patent Number: 4,827,394

[45] Date of Patent: May 2, 1989

[54] METHOD AND SYSTEM FOR SUPERVISION OF AN INDUSTRIAL INSTALLATION

[76] Inventor: Jean-Claude Wanner, La Grèze, Laussou, 47150 Monflanquin, France

[21] Appl. No.: 884,485

[22] Filed: Jul. 11, 1986

[30] Foreign Application Priority Data

Jul. 16, 1985 [FR] France .................. 85 10869

[51] Int. Cl.⁴ .................................................. G06F 1/00
[52] U.S. Cl. .................................. 364/138; 364/147; 364/181; 364/188
[58] Field of Search ........................ 364/188–192, 364/138–147, 468, 478, 181; 235/375, 376, 462

[56] References Cited

U.S. PATENT DOCUMENTS

| | | | |
|---|---|---|---|
| 4,303,973 | 12/1981 | Williamson, Jr. et al. | 364/189 |
| 4,396,977 | 8/1983 | Slater et al. | 364/188 |
| 4,408,291 | 10/1983 | Gunzberg et al. | 364/470 |
| 4,413,314 | 11/1983 | Slater et al. | 364/188 |
| 4,451,895 | 5/1984 | Sliwkowski | 364/188 |
| 4,475,153 | 10/1984 | Kihara et al. | 364/188 |
| 4,479,197 | 10/1984 | Haag et al. | 364/188 |
| 4,528,444 | 7/1985 | Hara et al. | 235/444 |
| 4,528,623 | 7/1985 | Tachibana | 364/188 |
| 4,570,217 | 2/1986 | Allen et al. | 364/188 |

Primary Examiner—Allen MacDonald
Attorney, Agent, or Firm—Blakely, Sokoloff, Taylor & Zafman

[57] ABSTRACT

A method for supervision and management of an industrial installation having a plurality of stations, each able to occupy at least two distinct functional states, and a corresponding system of supervision and management. In the discussed method of supervision and management of an industrial installation having a plurality of stations ($P_i$), each station is able to occupy at least two distinct functional states and the supervision is normally effected by an operator who, after controlling the functional state of each of the stations ($P_i$), is able to ensure the changing of the functional state of the said station. Each station ($P_i$) is assigned a coded identifying reference which, preliminarily to any operation on the stations ($P_i$), defines in a central console for control and management, a series of operations on each of the stations by the operator for establishing a corresponding system of supervision/management.

9 Claims, 6 Drawing Sheets

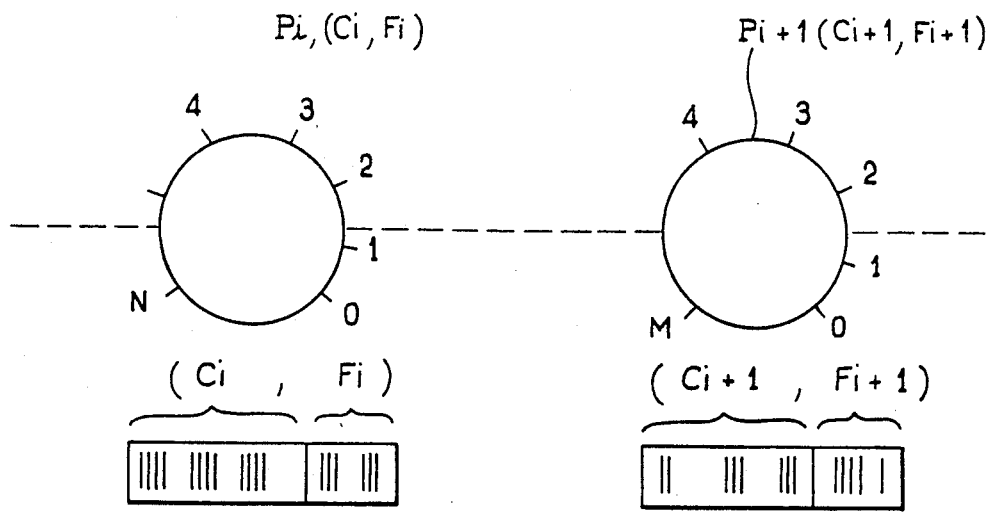
FIG_1a
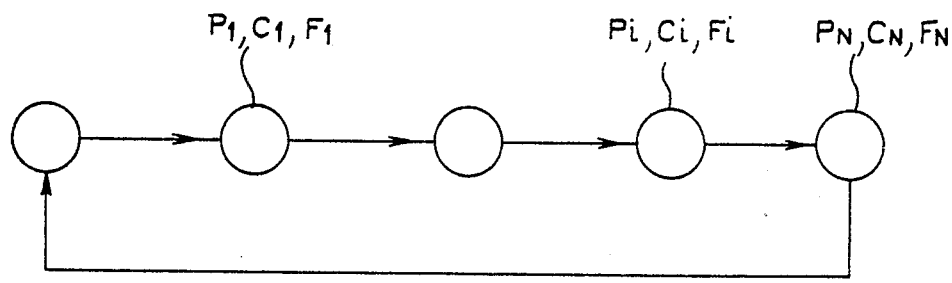
FIG_1b

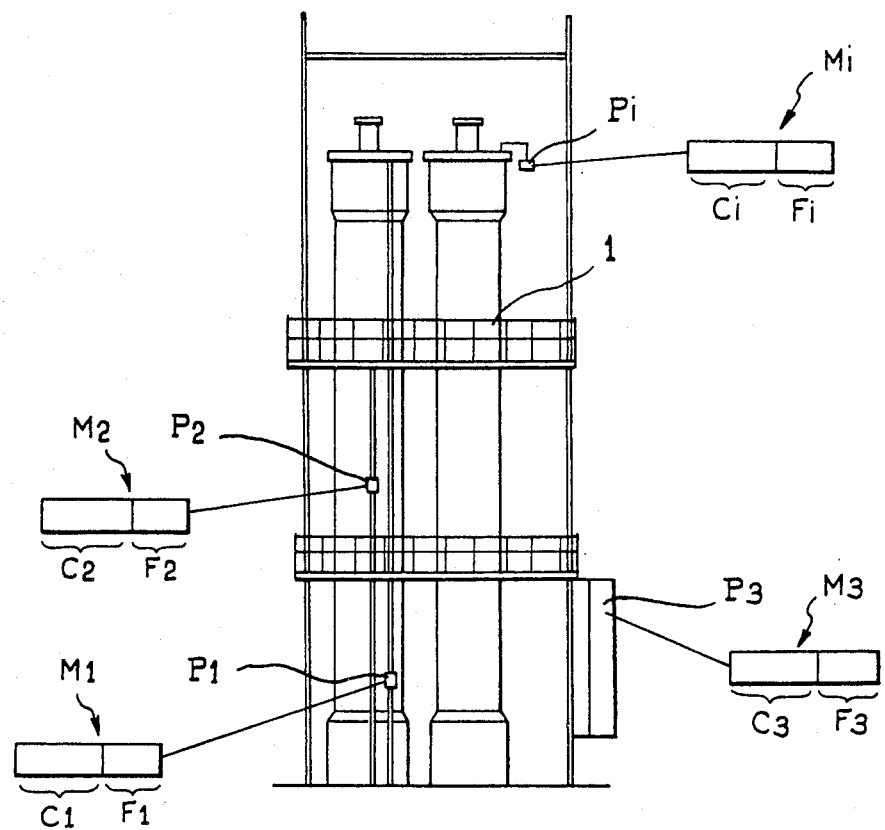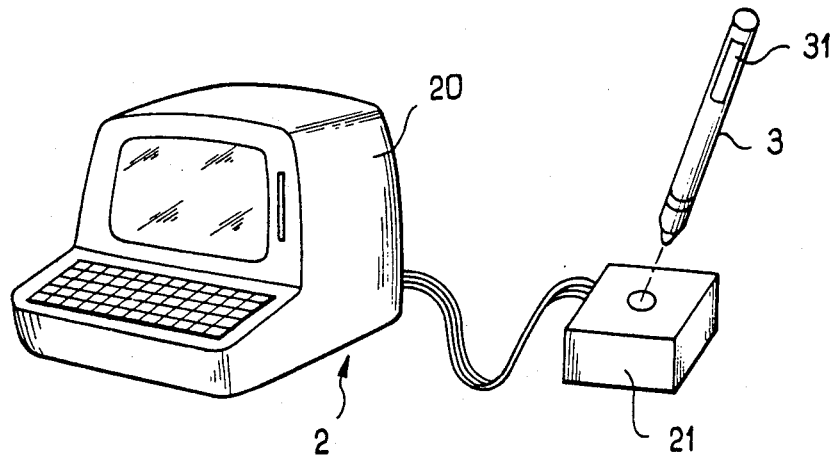
FIG_2

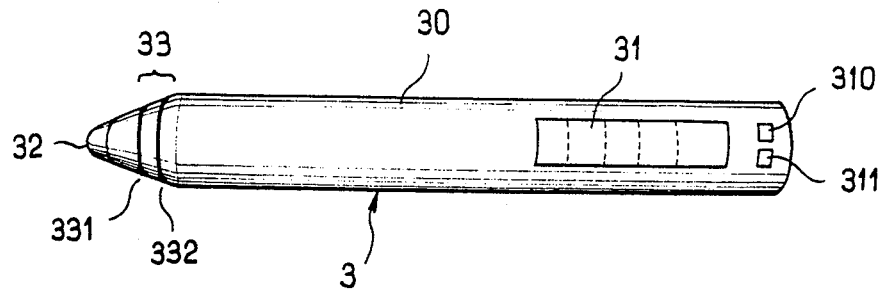
FIG_3a
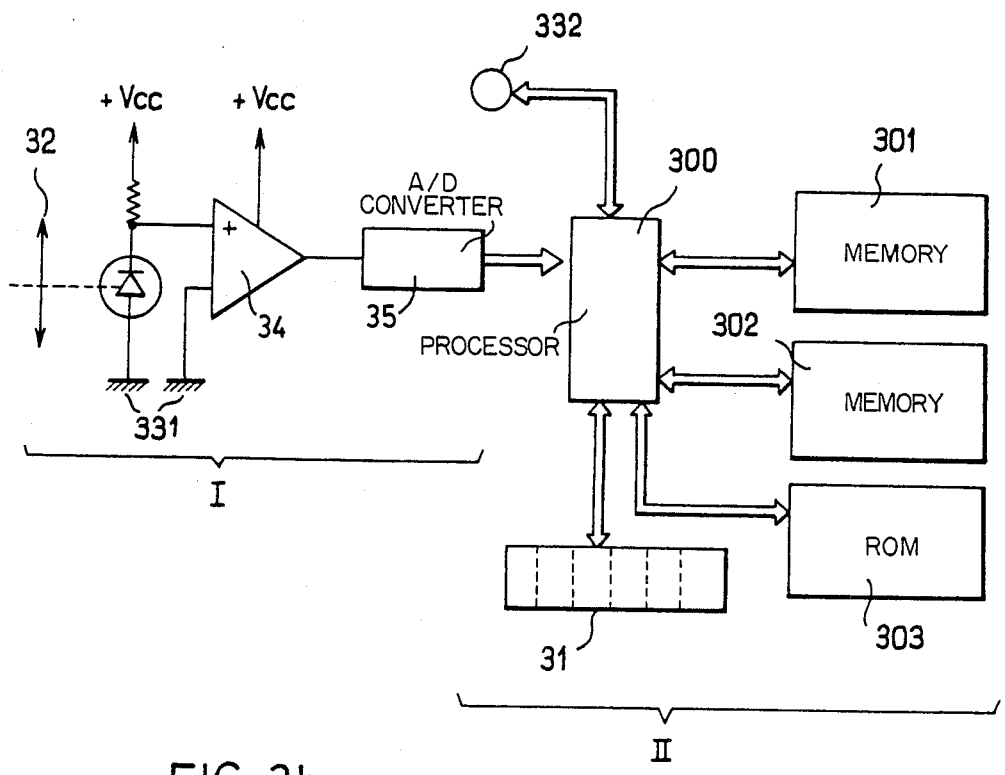
FIG_3b

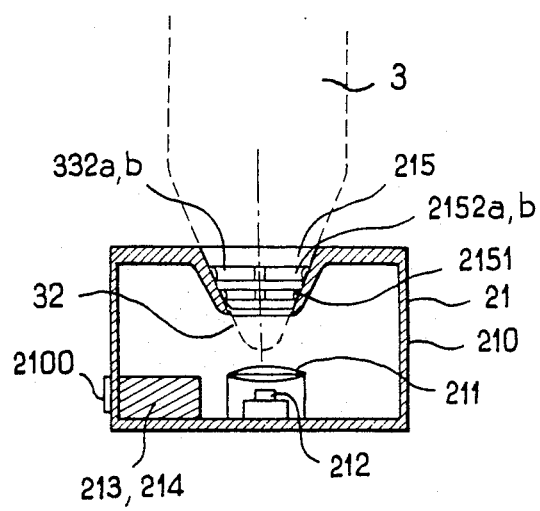
FIG_4a
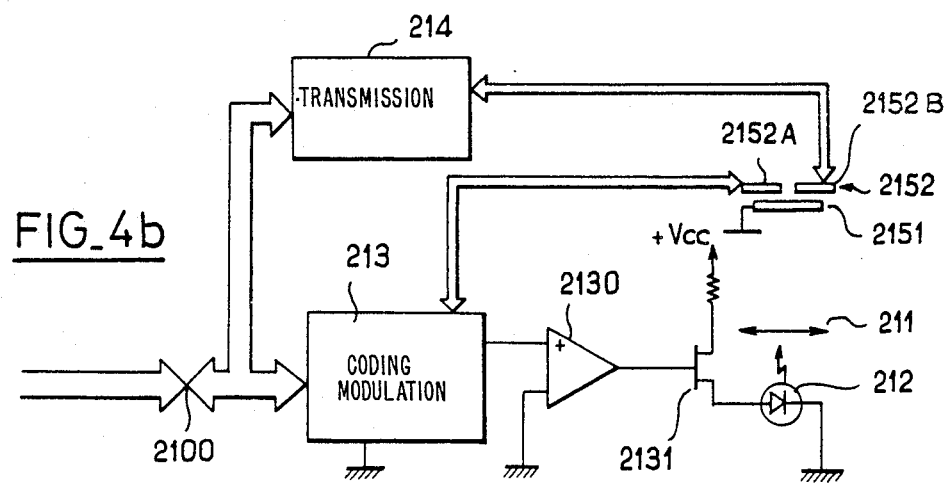
FIG_4b
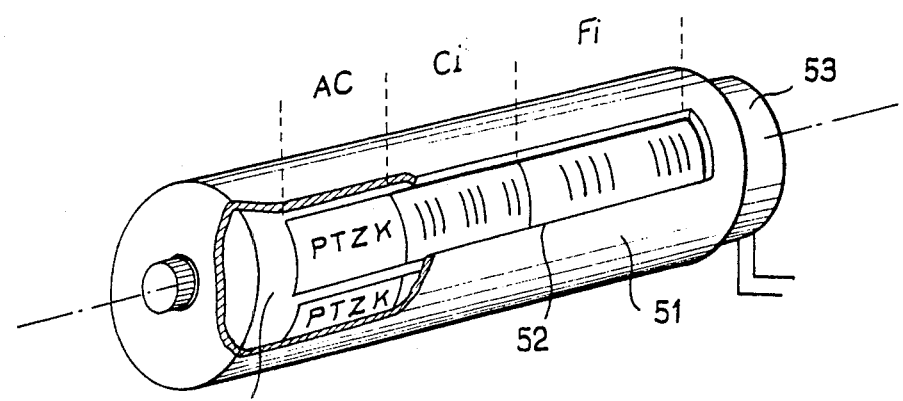
FIG_5

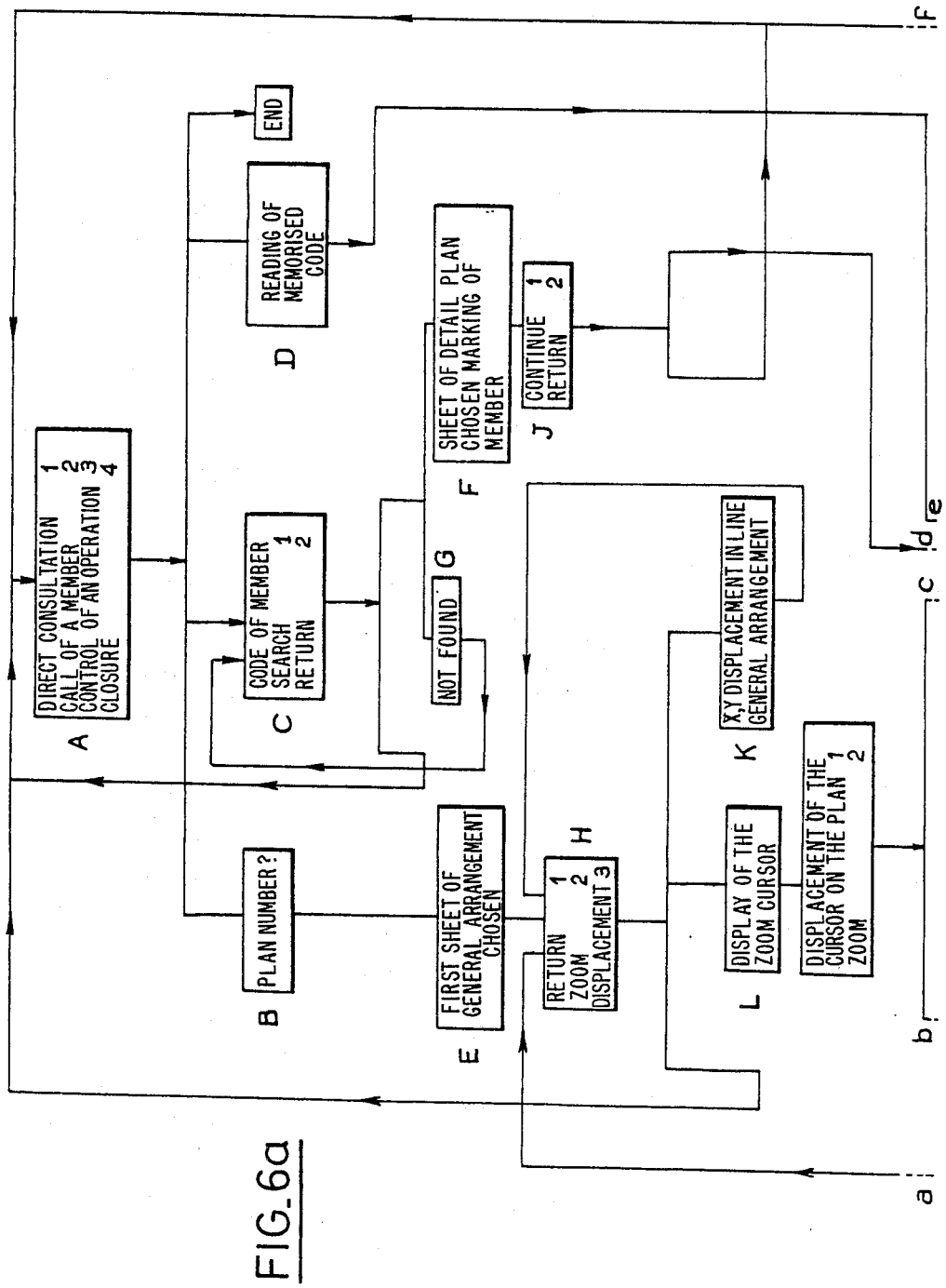
FIG_6a

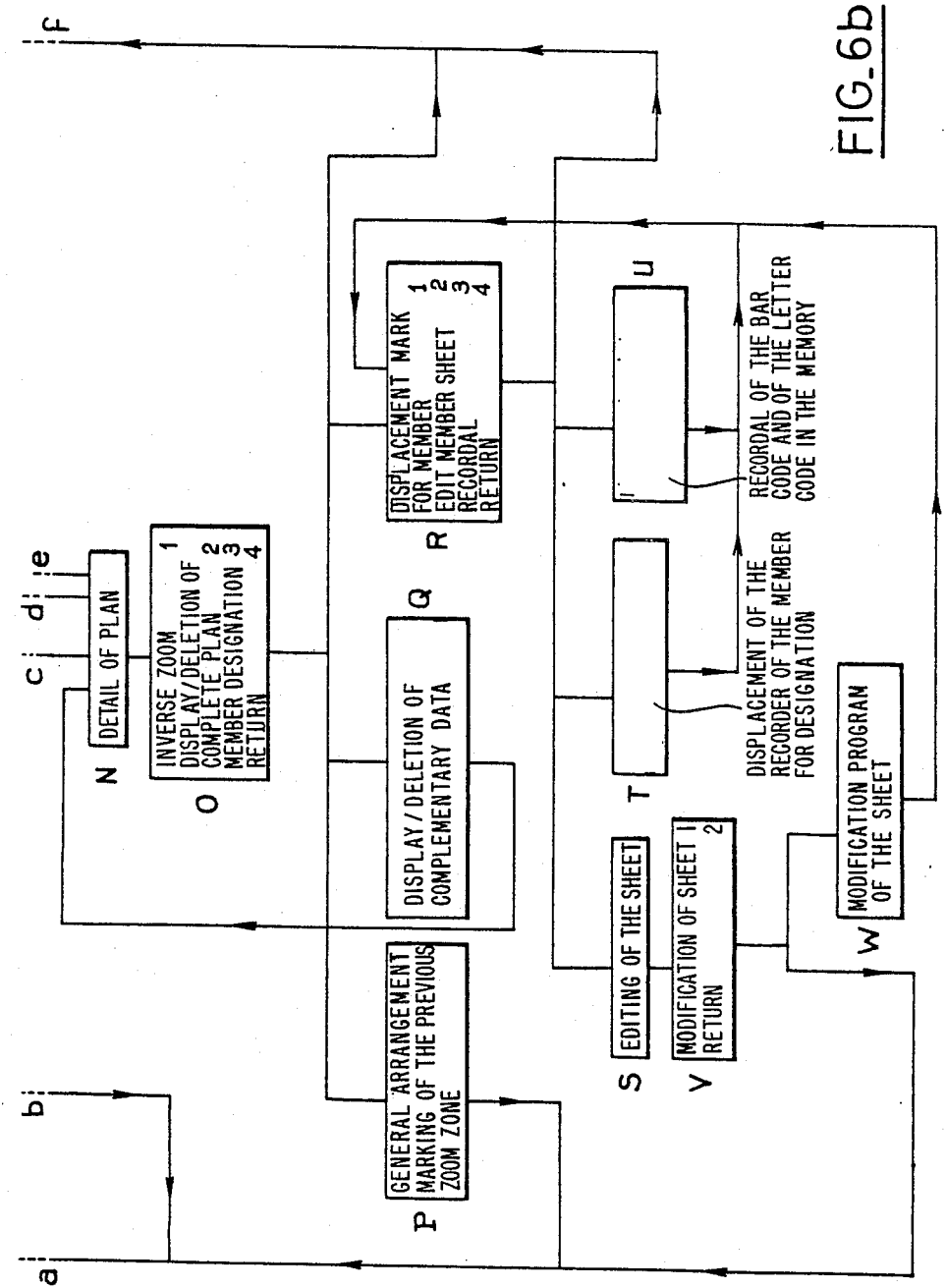
FIG_6b

METHOD AND SYSTEM FOR SUPERVISION OF AN INDUSTRIAL INSTALLATION

SUMMARY OF THE INVENTION

The present invention relates to a method of supervision and management of an industrial installation having a plurality of stations, each able to occupy at least two distinct functional states, and to a corresponding system of supervision and management.

Present industrial installations have a significant degree of complexity due to the constituent number and diversity of the functional stations and/or materials. The malfunctioning of these installations, essentially due to errors in identification of these materials in the course of the maintenance or normal operation of the installations by the personnel charged with carrying out the corresponding work, presents an important and increasingly acute problem. The problem leads to damaging consequences which are manifested by the malfunction of the installation, its temporary or total stoppage and, in the most serious cases, a risk of danger which is difficult for the site personnel to control and which may affect the populations of neighboring urban zones.

This type of error is characterized in the majority of cases by the fact that the operator charged with carrying out the work of changing the functional state of a member of the installation (opening a valve, for example) carries out this operation on another member than that which was intended. Generally this is done either on a member which has a designation code closely similar to that of the member in question (e.g., "valve RCP230VP" instead of "valve RCV230VP") or on a functionally identical member, of which the designation code is then correct, but belonging to a neighboring section.

In order to reduce to a minimum the probability of incidents of this type, it appears necessary:

(a) to reduce or remove the risk of transmission of an order for a wrong operation between the person responsible for carrying out the operation and the person charged with the actual execution of the operation, (b) to reduce or remove the risk of confusion relating to the position of the member of the installation on which the operation is to be executed, and (c) to permit the person responsible to verify that no confusion is present and that the order actually given is the one which has been executed.

At present, and in the majority of cases, the choice of operations to be carried out is made by reading plans of the installation on a paper support. These plans often contain no more than summarized information relating to the actual functional state of the system and installation. Poor knowledge of the actual functional state leads to decisions which can be dangerous, particularly where nuclear power stations or an installation for the treatment of highly toxic products is involved.

The designation of materials on which the operations must be executed can be carried out either orally or in writing. Placing the designation in writing does not significantly reduce the probability of errors in the transmission of the corresponding order. At most, it permits identification of the author of this error once it has been committed and then detected. The execution of the transmitted order, assuming that the transmission has been correctly executed, remains subject to the interpretation of the order by the person charged with its execution. This interpretation can only be executed as a function of the actual knowledge of the layout by the executor, because the actual topological disposition of the installation may differ fundamentally from the corresponding diagrams or plans, and the code that designates or identifies a member is not normally of a nature that constitutes a means of marking the locality of the member.

The executor, in trusting to his memory of the layout, may rely on his mental knowledge of the positions and shapes of the member in question without verifying the corresponding codes, or may carry out verification in the wrong manner.

Of course, where a series of operations is to be carried out in a predetermined sequence, the execution of these steps in a different order or sequence leads to an accrued risk of putting the system and/or installation in a different state than desired.

In fact in the absence of an effective return of information relating to the operations to the person responsible for the conduct of the operations, it is quite exceptional for the executor to be able to detect the resulting error manifesting itself at the level of the single execution and then to proceed to a suitable correction except in very limited cases, and only then as the result of a belated detection of error and an even more belated positioning of the member on which the erroneous operation has been carried out.

An object of the present invention is the provision of a method and system of management of a complex industrial installation in which the risk of failure, due to human intervention, is reduced to a minimum, while the method and device of the invention do not necessitate supplementary, onerous and complex installations for remote supervision or servo-control at a distance.

Another object of the present invention is the provision of a method and system of management of an industrial installation which is evolutionary and flexible, being easily modifiable in relation to structural, architectural and/or functional modifications of the installation upon its modernization.

The method of supervision and management of an industrial installation having a plurality of stations (Pi), each able to occupy at least two distinct functional states and in which supervision is normally effected by an operator who, after controlling the functional state of each of the stations (pi), is able to ensure the changing of the functional state of the said station, is remarkable in that it consists of attributing to each station (Pi) a coded identifying reference which, preliminarily to any operation on the stations (Pi), defines in the region of a central console for control and management a succession in time of operations on each of the stations by the operator for establishing a corresponding sequence of supervision/management called reference. Each operation and the identifying reference of the corresponding station (Pi) constitute a stage, at which the sequence relating to each station (Pi) is memorized at a supervisory witness system. The identification of a station (Pi) on which an operation is to be carried out is brought about and/or displayed in the clear at said supervisory witness system by carrying out a comparison between the coded identification information attributed to the station (Pi) under consideration and the information memorized at the supervisory witness system for establishing, from the supervisory witness system, an order of carrying out or validation of the operation. Such validation is accomplished by memorizing the stage of the sequence carried out and bringing about, and/or displaying on the supervisory witness system, identification information of the following station (Pi+1) on which an operation of supervision/management is to be carried out, and then repeating the two preceding stages for all the stations (Pi) according to the said sequence.

The system for supervision and management of an industrial installation comprising a plurality of stations (Pi) in accordance with the process of the invention is remarkable in that it comprises identification means for each of the stations (Pi) whereby an identifying reference expressed in code and/or in the clear is provided; a central console for control and management permitting the definition, from the identifying references of each of the stations (Pi) and preliminarily to any operation of the said stations, of a succession in time of operations on each of the stations by the operator for establishing a corresponding sequence of supervision/management called reference, each operation and the identifying reference of the corresponding station (Pi) constituting a stage of said sequence; and a supervisory witness system able to memorize the reference sequence and carry out sequential reading/memorizing of the identifying reference code for each of the stations (Pi), said supervisory witness system after reading/memorizing the reference of a station (Pi) being adapted to generate a validation order for the operator then to bring about or display on the supervisory witness system the identification information (Pi+1) on which an operation of supervision/management must be carried out, said supervisory witness system being further adapted to memorize the assembly of readings of each of the stations (Pi) for constituting a sequence of stages actually carried out and the central console for control and management being able to carry out a comparison between the reference sequence and the sequence of stages carried out.

The device and method of the invention find application in the supervision and management of industrial installations of any type including nuclear power stations for the production of electric energy, raw material refineries, steel works and the like. These and other objects of the present invention will be more readily understandable from reading the following detailed description with reference to the accompanying drawings.

BRIEF DESCRIPTION OF THE DRAWINGS

FIGS. 1a and 1b show an illustration of the method of the present invention;

FIG. 2 shows a view of an industrial installation and of a particular embodiment of the system permitting the supervision and management of this industrial installation according to the method of the invention.

FIG. 3a shows a detail of the preferred embodiment of a constituent element of the system according to the invention and FIG. 3b shows an electric circuit diagram of the element shown in FIG. 3a;

FIG. 4a shows a detail of the preferred embodiment of another constituent element of the system of the invention, complementary to the element shown in FIG. 3a, and FIG. 4b shows an electric circuit diagram of the element shown in FIG. 4a;

FIG. 5 shows a detail of the preferred embodiment of means for identification of each of the stations or members of the industrial installation to be supervised;

FIG. 6 shows a flow chart representing the function of the system according to the method of the invention, the two sheets FIGS. 6a and 6b constituting the entire FIG. 6.

DETAILED DESCRIPTION OF THE INVENTION

The method of the invention will now be illustrated in connection with the description of FIGS. 1a and 1b.

The industrial installation submitted to a method of supervision and management according to the invention has a plurality of stations designated Pi, Pi+1 in FIG. 1a. Each station occupies at leas two distinct functional states. In FIG. 1a, the functional states of stations Pi, Pi+1 are represented in a schematic manner by graduations designated respectively from O to N and from O to M and corresponding, for example, to a position of particular adjustment defining a corresponding functional state for the considered station Pi, Pi+1. The supervision of each of the stations Pi, Pi+1 is normally carried out by an operator or executor able to ensure the change of state of each station.

In accordance with the invention, each of the stations Pi is characterized by a coded identifying reference designated respectively for the station Pi, Pi+1 by the symbols Ci, Ci+1. Further, a representation of the functional state respectively designated Fi, Fi+1 for each of the stations Pi, Pi+1 is also attributed to each of the mentioned stations. Thus, as shown in FIG. 1a, each of the stations Pi is defined by its identifying reference Ci to which is associated the information of its functional state Fi.

Prior to any operation on the stations Pi, a timed sequence of operations on each of the stations by the operator is defined. This defines a corresponding sequence of supervision/management tasks for the installation called the reference sequence. Each operation and the identifying reference of the corresponding station Pi constitutes a stage, which is defined by the identifying reference Ci of the station Pi. The reference sequence for each of the stations Pi concerned is then recorded at a supervisory witness system, and the identification of the station Pi on which an operation is to be carried out is displayed at the supervisory witness system. Then, a comparison is made between the information of the coded identification of the station Pi under consideration, and the information in the reference sequence recorded at the supervisory witness system. This establishes from the supervisory witness system an order of operation or validation of operation interpretable by the executing operator. Once the preceding validation has been acquired, the stage of the sequence effectively reached by the executing operator is memorized at the supervisory witness system. The identifying information of the following station Pi+1 on which a supervision/management operation is to be carried out is then brought about and/or displayed on the supervisory witness system in a manner interpretable by the executing operator. The preceding steps relating to identifying a station, conducting a comparison between the coded identifying information and the information memorized at the supervisory witness system, recording the sequence actually carried out and displaying on the supervisory witness system the identifying information of the following station Pi+1 on which an operation is to be carried out are repeated for all the stations in the reference sequence.

As is further shown in FIG. 1b, a comparison is carried out between the series of stages or sequences effectively carried out by the executing operator (and memorized at the supervisory witness system) and the reference sequence, so that control may be asserted at central console for control and management of the method of the invention when the operation of supervision has been carried out on the last considered station Pi to be supervised. In FIG. 1b, the last station on which an operation has been carried out is designated PN. The station is characterized by its identification parameters and functional parameters designated $C_N, F_N$. The comparison at the central control and management console is illustrated by the return arrow. The reference sequence is illustrated by the successive passage of the supervisory light display at the stations designated Pl, Pi and their respective identification parameters Ci, Fi.

In the presently preferred embodiment of the present invention, the references coded for identification Ci and for information of the functional state Fi attributed to each of the stations Pi are geographically positioned at each of the stations. The information relative to each station is coded in the form of a bar code and the supervisory witness system is constituted as a light pencil system provided with a display. Preferably, the information is coded according to a code of type 39, that is, a bar code of the alphanumeric type. This code has already been the subject of industrial applications for the designation and identification of products and a definition thereof does not appear necessary since it is normally known in the art of coding. Employing such a system and method of coding in the present invention provides great ease of use and safety. Further, the method of the invention is flexible and able to be modified to fit significant extension or modification of the industrial installation to be supervised. These modifications are essentially brought about solely by increasing the references for coded identification and for information about the corresponding functional state in line with the possible increase in the stations, and are limited only by the memory capacity of the supervisory witness system and the central control console.

The device of the system for supervision and management of an industrial installation in accordance with the process of the invention will now be described in a more detailed manner in connection with FIG. 2.

In this Figure is shown schematically at 1 an industrial installation of a given type in which the different means for identification of each of the stations Pi are shown. These means of identification are respectively referenced $M_i$ for each of the stations Pi and provide an identifying reference expressed in a coded or uncoded manner. Of course, the identification is useful where the operations are effected by an individual executing operator and the information relating to the functional state of each station Pi can also be displayed in the clear.

A central console for control and management is shown at 2 and permits defining from the identifying references of each of the stations Pi and their functional state, preliminarily to any operation on the stations, a sequence of operations to be executed for establishing the corresponding supervision/management sequence called the reference sequence. Each operation and the identifying reference of the corresponding station, as well as its functional state, constitutes a stage of this sequence. In FIG. 2, the central console for control and management consists of a microcomputer 20 provided with its peripherals.

Further, a supervisory witness system referenced 3 is able to memorize the reference sequence and to carry out sequential reading/memorization of the sequence of coded identifying references of each of the stations Pi. The supervisory witness system 3, after reading/memorization of the reference sequence, is adapted to generate a validation order for execution of the operation to the executing operator and then to bring a display on the supervisory witness system 3 of the identifying information of the following station Pi+1 on which a supervision/management operation is to be carried out. The supervisory witness system 3 is further adapted to memorize the entirety of readings of information in coded designation Ci and functional state Fi of each of the stations Pi for recording the sequence of stages actually carried out by the operator. The central console for control and management 2 is able to carry out a comparison between the reference sequence and the sequence of stages actually carried out.

Where the operator is an individual, the supervisory witness system 3 is constituted as a system of the light pencil type, comprised of display means 31 which permit the display, in uncoded form, the identifying reference of each station Pi and its functional state. Further, a read/write station of the witness system 3 can be constituted in a manner to form a supplementary peripheral of the microcomputer 20. In FIG. 2, this writing station is referenced 21.

The supervisory witness system 3 will now be described by means of FIGS. 3a and 3b. In an advantageous manner, as shown in FIG. 3a, the supervisory witness system 3 can be constituted as a light pencil system comprising display means for permitting the display by light of the identifying reference Ci and functional state Fi of each station Pi. A light pencil system has the advantage of a form readily applicable to the method of the invention. In effect, a light pencil as shown in FIG. 3a permits concurrent reading of the references of coded identification Ci and functional state Fi of each station Pi. The memorization of this information is performed by the light pencil system and used by the central microcomputer to define and generate a reference sequence. The memorization of the identifying reference Ci and functional state Fi of each of the stations Pi on which an operation is effectively to be made by the executing operator is performed with a view to constituting the sequence of operations effectively carried out. The management of the sequence of operations is effectively carried out by comparison of the identifying reference Ci and functional state Fi positioned at each of the stations with the reference sequence, and signalling to the executing operator the validation or nonvalidation of an operation to be executed on the site of each of the stations Pi by a comparison of identifying references of the station Ci, Fi with the stages of the corresponding reference sequence.

As shown in FIG. 3a, the light pencil system 3 comprises a body 30 made of molded material. At the end of the body, optical means 32 permits the reading of references of coded identification Ci and functional state Fi of each of the stations Pi. These optical reading means constitute an optical system normally used in known light pencils and, because of this, will not be described in detail. The body 30 of the light pencil system also comprises a display window 31 in which means for the conditional display by light of information memorized in the light pencil system is provided. Further, two signal lights 310, 311 can be provided in order to produce signals for the executing operator for validation or non-validation of the operation to be carried out. Of course, the placing of the display window 31 and the signal lights 310, 311 in FIG. 3a is given by way of non-limitative example only. The lights 310 and 311 can have different complementary colors and be comprised of electroluminescent diodes of different color. Further, the body 30 of the light pencil system comprises, in its tapered part, two reference electrodes 331, 332 which constitute a control contact 33. The control contact 33 may be provided in any form provided that it consists of two separate conductor elements, one being capable of receiving an electric reference voltage and the other being capable of receiving a so-called control voltage. In FIG. 3a, the electrodes 331 and 332 are advantageously shown in the form of rings centered on the longitudinal axis of the body of the system of light pencil 30 and spaced by a determined interval in order to ensure their electric insulation. The rings 331, 332 are flush with the surface of the tapered part of the body 30 and are adapted, as will be described later, in a manner to suitably engage in the read/write station 21. The body 30 of the light pencil system comprises and encloses the assembly of circuits shown in FIG. 3b, permitting the carrying out of the functions already mentioned. In this FIGURE, a part referenced I comprises optical means 32 and bar code detection circuits shown in a symbolic manner by a detecting photodiode, an intermediary amplifier and a circuit for shaping the resulting electric signals. In this part, the reference voltage of the assembly of the device is designated as corresponding in fact to the voltage of the electrode 331. This part will not be described because it can be advantageously constituted by circuits normally used in known light pencils. Further, the part referenced II comprises first memorization means, designated 301, for information read in accordance with the bar code and second memorization means 302 for information called references relating to the identification of the station Pi and/or its functional state. Processor means 300 are also provided for managing the memorization in the first 301 and/or second 302 memorization means of corresponding information, either the information effectively read preliminarily to the operation or the information to be read constituting the reference sequence. The processor 300 receives the signals given by the detection part I and the control signal delivered by the electrode 332 (when this is present) and permits the display of identification and/or functional state at the display means in the window 31.

The read/write station 21 will now be described by means of FIG. 4a, which shows a transverse cross-section of the read/write station, and FIG. 4b, which shows the electric circuits contained in the read/write station. The read/write station 21 comprises a body 210 of molded material, comprising at its upper part an indentation of a shape adapted to the tapered part of the body 30 of the light pencil system so that the introduction of the latter into the indentation permits positioning in flush support and the introduction of the optical system 32 to the interior of the body. On the wall of the indentation are reference electrodes 2151 and 2152. They are specially adapted mechanically for receiving the corresponding electrodes 331 and 332 arranged on the tapered part of the body 30 of the light pencil system. In FIG. 4a, the indentation intended to receive the tapered part of the body 30 is referenced 215 Inside the body 210 are arranged circuits for coding/modulation 213 permitting an on/off modulation of the intensity of light delivered by an electroluminescent diode 212 and focusing means 211. The electroluminescent diode 212 and the focusing means 211 are centered on the axis of symmetry of the indentation 215. A series connected input 2100 is connected to the coding/modulation circuits 213. Also as shown in FIG. 4b, the coding/modulation circuit 213 is connected to an intermediary amplifier 2130 controlling a commutation circuit 2131. The circuit can advantageously be constituted by a field effect transistor and control the electroluminescent diode 212. Further, the coding/modulation circuit is connected to the electrodes 2152 and 2151, the electrode 2151 being for example connected to the reference voltage of the device and the electrode 2152 receiving from the coding/modulation circuit 213 a TTL voltage constituting the so-called control voltage applied to the contact 33 of the light pencil system o use of this for the definition of the reference sequence. By way of non-limitative example, and in an advantageous manner, the coding/modulation circuit 213 can be constituted by the coding/modulation circuit used in apparatus available on the market such as bar code printers, this circuit delivering pulses for corresponding modulation of the electroluminescent diode 212.

A more detailed description of the functioning of the system of the light pencil 3 and of the read/write station 21 will now be provided. For the definition of the reference sequence, the light pencil system 3 is placed as shown in FIG. 4a in the indentation 315 of the read/write station 21. The latter is connected to the microcomputer by the input 2100 which receives from the microcomputer in the form of coded electric signals the stages, formed by the information for identification Ci and/or corresponding functional state Fi at each station Pi, on which an operation is to be carried out by the executing operator. The circuit for coding/modulation 213 delivers the control voltage to the electrode 2152 and to the electrode 332 in contact with it. The management processor 300 under the influence of the control voltage delivered by the electrode 332 ensures the switching of the corresponding information and the memorization in the second memory means 302 in order to constitute, in the witness system 3, the reference sequence. The reference sequence is generated by modulation of the electroluminescent diode 212 by the coding/modulation circuit 213, detected by the part I of the internal circuits of the light pencil system 30 and registered in the memory 302.

Upon carrying out of the operations on the stations Pi of the installation, the light display or light pencil system permits, in the absence of a control voltage on the electrode 332, information to be read for identification Ci and/or functional state Fi geographically positioned at each of the stations Pi. For each of the stations, the corresponding information is recorded in the memory 301 and compared sequentially at the corresponding stage of the reference sequence 302 via the management processor 300, and an order of validation or non-validation is given consisting of the illumination of one of the colored light signals 310, 311 and display by light of the designation of the corresponding station Pi at the display window 31. The executing operator can then execute the programmed operation, which itself can be displayed by light at the display window 31 By way of example, the means 301 and 302 can consist of addressable memories with an 8K-byte capacity and the display means 31 can be a liquid crystal display. A permanent ROM memory 303 is provided which permits the uncoded display of the mentioned information at the display window 31 by referencing a conversion table between the coded information and the uncoded alphanumeric representation.

At the end of the operations, the executing operator returns the light pencil system 3 to the person responsible for supervision/management of the sequence now made, which is carried out as follows: the light pencil system is once more placed in position in the indentation 215 of the read/write station 21 as shown in FIG. 4a. It should be noted that, in an advantageous manner, the electrode 2152 and the corresponding electrode 332 are each divided into at least two equal sectors, 2152a, 2152b, 332a, 332b. The sector 2152b of the read/write means 21 is connected by a bus connection to a read transmission circuit 214, which is itself connected directly to the input 2100. Of course, the indentation and the tapered part of the body 30 of the light pencil system are provided with a locating rib or any equivalent means. After positioning of the light pencil system, the responsible person can choose the reading of the memory means 301 in the memory of which the sequence of operation actually carried out by the executing operator has been put. This choice is controlled from the microcomputer, which permits the generation of a voltage intermediary to the TTL level on the electrode 2152a, which is transmitted via the electrode 332a and detected by the processor 300. The processor 300 then generates the order for reading the sequence recorded in the memory 301 and the transmission of bits of corresponding information via the electrode 2152b and the intermediary buffer circuit for transmission 214 in the central memory of the microcomputer. Control of the sequence actually made is effected by the corresponding stages of the reference sequence recorded in the memory of the microcomputer.

A complete description of the means for display of the identification and functional state of the stations Pi designated Mi on FIG. 2 will now be given in connection with FIG. 5.

These means are preferably constituted by a device comprising at least one first display zone with the coded identification of the station Pi in accordance with the bar code and a second display zone with the functional state of the station coded with the same or a different code. These zones are designated Ci and Fi. The first display zone consists of a display on which the bar code is printed. The second display zone consists of display elements controlled directly by the functional state of the station. Of course, a zone of light display designated AC can be added in the vicinity of the display zone for the coded identification relative to the station Pi. Preferably, as shown in FIG. 5, the display elements consist of a cylinder 50 movable in rotation, the lateral surface of which is divided into at least two elemental surfaces delimited by the two generatrices of the cylinder. For a station Pi with several functional states, the cylinder comprises a number of elemental surfaces forming bands equal in number to the functional states of the station. Each band is subdivided into zones on which are carried coded information to be displayed in light. The display device comprises a body 51 surrounding the cylinder 50 and provided with a window 52 allowing at least one band having an equivalent surface to appear. Driving the display (i.e., the direct control by functional state of the station) is ensured by a stepper motor 53 directly controlled by the control means of the corresponding station Pi.

In the preceding description of the light pencil system 3 and of the read/write station 21, the shape of the electrodes 332a and 332b and 2512a and 2512b, respectively, has been given solely by way of example. It will be apparent to one skilled in the art that a different shape or configuration of the electrode can be used which will not depart from the scope of the present invention. Similarly, the mode of recording the reference sequence in the memory 302 of the light pencil system 3, as well as the reading of the sequence actually made by the executing operator and its recording in the memory 301, are given by way of example. Any mode of embodiment in which the given information Ci, Fi is effected by way of electric signals alone, and the light pencil system 3 and read/write station 21 are then provided with supplementary means for connection in series such as a RS232C connector, does not depart from the scope of the present invention.

The light pencil system 3 and the read/write station 21 previously described permit the advantageous reduction or removal of the risk of transmission of erroneous references of the identification and/or functional state of the stations Pi on which the operations must be carried out. The references of designation and/or functional state are assumed to have been suitably defined by the person responsible for the entirety of the programs for supervision and management of the installation. However, the method and system of the device of the present invention permit further, in a unique way, the reduction and, to a certain degree, removal of the errors of designation of the stations Pi on which the program of supervision must be carried out. Because definition of the reference sequence by the responsible person is able to be carried out in a quasi-automatic manner (as will be described below), operation of the light pencil system 3 by the person responsible for the definition of the mentioned sequence is reduced to a minimum.

To this end, the recording of the reference sequence in the second recording means 302 of the light display is carried out by means of a sequence of operations managed by a "menu" type program loaded into the central memory of the microcomputer 20. In particular, this program defines the operations involved in placing the witness system or light pencil system 3 into the read/write station 21 or loading station constituting one of the peripherals of the microcomputer. An order and a display on the microcomputer's video monitor of a block diagram representative of at least a part of the industrial installation is then made. The diagram shows the stations Pi to be supervised or managed by logos and/or mnemonic symbols. The XY position of each of the symbols representing the stations Pi on the video screen is representative of the coded identifying reference of each of the stations Pi and its functional state. A recorded correspondence table in the memory of the microcomputer permits, for each of the block plans, the establishment of a correspondence between a station Pi represented at XY on the plan and its reference for identification Ci and/or its functional state Fi. The same program further permits the direct designation of the coded identifying reference and/or functional state of the station Pi to be memorized in the second memory means 302 of the light pencil system 3. This designation can in an advantageous manner be effected by the responsible person by mechanical or optical pointing to XY on the screen of the video monitor display of the mnemonic signal or logo considered. In the case of mechanical pointing, the screen of the video monitor of the microcomputer is provided with a tactile screen; in the case of an optical pointing, this is directly effected on the screen of the video monitor by means of a light pencil of known type. (Such apparatus will not be described in detail because it constitutes a peripheral currently used in the micro-information art and its functions are well known to a person of ordinary skill in the art.) Of course, any type of apparatus able to effect an XY pointing, such as a "mouse", may also be used.

I claim:

1. A method of supervision and management of an industrial installation, said installation having a plurality of stations each able to occupy at least two distinct functional states, wherein said method comprises the steps of:

attributing to each of said stations a coded identifying reference and functional state information;

defining, preliminary to any operation on said stations, at a central console for control and management, a sequence of operations to be performed at each of said stations for establishing a reference sequence of operations of supervision and management for each of said stations corresponding to said coded identifying reference and functional state information;

recording at a supervising witness system said reference sequence of operations of supervision and management for each of said stations;

displaying on said witness system uncoded identification of one of said stations at which an operation is to be carried out by said individual and effecting a comparison between said coded identifying reference and functional state information of said one of said stations and the corresponding coded identifying reference and functional state information stored in said reference sequence recorded at said supervisory witness system, thereby establishing from said supervisory witness system a sequence of operations, wherein each operation to be performed at each station and the identifying reference and functional state information of the corresponding station constitutes a stage;

storing said stage of said sequence of operations to be performed by the individual, and displaying in an uncoded manner on said witness system the identifying information of the next station on which a sequence of operations of supervision and management is to be carried out by said individual; and repeating the two preceding steps for each of said plurality of stations according to said reference sequence of operations.

2. A method according to claim 1 further comprising the step of comparing the stored stages of the sequence of operations and said reference sequence of operations of supervision and management and using the results of said comparison at said central console for control and management of said installation.

3. A method according to claim 1, further comprising the step of locating said coded identifying reference and said functional state information attributed to each of said stations, wherein said information for each of said stations is coded in bar code form.

4. A system for supervising and management of an industrial installation having a plurality of stations each able to occupy at least two distinct functional states in which the supervision and management operation is carried out by an individual able, after checking or controlling of the functional state of each of said stations, to ensure the change of functional state when necessary of said station, said system comprising:

means for identification of each of said stations, said means providing an identifying reference and functional state information expressed in at least one of a coded and uncoded version for each said station, said means being geographically located at each said station;

a central control and management console means for permitting the definition from said identifying reference and functional state information of a reference sequence of operations on each of said stations to be performed by said individual, each said operation and the identifying reference of said station constituting a step of said reference sequence;

a supervisory witness means for recording said reference sequence and for carrying out a sequential reading and recording of said coded identifying reference and functional state information of each said station, said witness means comprising means for generating a validation order after reading and recording said identifying reference and functional state information of said station, means for showing said order to said individual, and means for displaying in uncoded version on said witness means the next station at which an operation of supervision and management is to be carried out, said witness system being further comprising means to record and memorize the entirety of the readings of said identifying reference and functional state information of each said station thereby establishing a sequence of stages actually carried out by said individual and said central console comprising means for effecting a comparison between said reference sequence of steps and said carried out sequence of stages.

5. A system according to claim 4, wherein said central console for control and management comprises a microprocessor coupled to at least one peripheral unit.

6. A system according to claim 4 wherein said witness system comprises a light pencil system having display means permitting the display in uncoded version of the identifying reference of each said station.

7. A system according to claim 6 wherein said light pen system comprises:

optical means for reading a bar-code;

a first memory means for recording information read from said bar-code;

second memory means for recording reference information relating to the identifying reference and functional state information of each said station;

processor means for managing the recording in said first and second memory means and for ensuring a comparison between the information recorded in said first and second memory means; and means for the conditional uncoded display of the information recorded in at least one of said first aid said second memory means.

8. A system according to claim 7 wherein said light pencil system further comprises an external connection terminal means for receiving a control signal authorizing the charging into said memory means of reference information constituting said sequence of operations for supervision and management.

9. A system according to claim 4 said central console for control and management is a microcomputer provided with a display monitor and with a loading station for the light pencil system, the recording or storing of said reference information in said second memory means of said light pencil system being carried out by means of a sequence of operations managed by a program of the menu type having the operations of:

placing said witness system in a loading station constituting one of the peripherals of said microcomputer;

calling and displaying on said monitor a block diagram representing at least one part of the industrial installation on which said station to be supervised or managed is shown by logos and mnemonic symbols, the XY position of each of the mnemonic symbols representative of these stations on the monitor screen being representative of the coded identifying reference of each of said stations; and directly designating the coded identifying reference to be recorded or stored, by mechanical or optical XY pointing on said monitor screen to said mnemonic symbol or logo and loading into said second memory means said corresponding coded references.

* * * * *

UNITED STATES PATENT AND TRADEMARK OFFICE
CERTIFICATE OF CORRECTION

PATENT NO. : 4,827,394
DATED : 5/2/89
INVENTOR(S) : Wanner

It is certified that error in the above-identified patent and that said Letters Patent is hereby corrected as shown below:

| | | |
|---|---|---|
| col. 07, line 67 | after "215" | insert --.-- |
| col. 08, line 18 | delete "o" | insert --on-- |
| col. 08, line 65 | after "31" | insert --.-- |

Signed and Sealed this

Nineteenth Day of March, 1991

Attest:

HARRY F. MANBECK, JR.

*Attesting Officer*     *Commissioner of Patents and Trademarks*